US009520217B2

(12) United States Patent
Meulenberg et al.

(10) Patent No.: US 9,520,217 B2

(45) Date of Patent: Dec. 13, 2016

(54) METHODS FOR CREATING LIGAND INDUCED PARAMAGNETISM IN NANOCRYSTALLINE STRUCTURES

(75) Inventors: Robert W. Meulenberg, Orono, ME (US); Jonathan R. I. Lee, Livermore, CA (US); Anthony W. Van Buuren, Livermore, CA (US); Louis J. Terminello, Danville, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1676 days.

(21) Appl. No.: 12/332,671

(22) Filed: Dec. 11, 2008

(65) Prior Publication Data

US 2010/0148112 A1 Jun. 17, 2010

(51) Int. Cl.

*H01F 1/00* (2006.01)
*C09K 11/02* (2006.01)
*H01F 1/42* (2006.01)
*H01F 1/40* (2006.01)

(52) U.S. Cl.

CPC ................ *H01F 1/42* (2013.01); *H01F 1/402* (2013.01)

(58) Field of Classification Search

CPC ......... H01F 1/005; C09K 11/02; C09K 11/025
USPC ....... 252/301.36, 301.6 R, 62.51 R; 977/832, 977/773
See application file for complete search history.

(56) References Cited

U.S. PATENT DOCUMENTS

| | | | | |
|---|---|---|---|---|
| 5,446,286 | A * | 8/1995 | Bhargava | G01L 1/16 250/361 R |
| 6,642,538 | B2 | 11/2003 | Efros et al. | 257/30 |
| 6,869,545 | B2 | 3/2005 | Peng et al. | 252/301.6 |
| 6,872,249 | B2 | 3/2005 | Peng et al. | 117/68 |
| 7,205,048 | B2 | 4/2007 | Naasani | 428/403 |
| 2006/0032755 | A1 | 2/2006 | Herman et al. | 205/109 |
| 2007/0110816 | A1* | 5/2007 | Jun et al. | 424/490 |
| 2007/0140951 | A1 | 6/2007 | O'Brien et al. | 423/592.1 |

FOREIGN PATENT DOCUMENTS

| | | | | |
|---|---|---|---|---|
| WO | 2005/123575 A1 | 12/2005 | | B82B 3/00 |
| WO | 2007/001438 A2 | 1/2007 | | |

OTHER PUBLICATIONS

Li. Enhanced Self-Assembly of Pyridine-Capped CdSe Nanocrystals on Individual Single-Walled Carbon nanotubes. Chem. Mater. 2006, 18, 164-168.*

Kalyuzhny. Ligand Effects on optical Properties of CdSe Nanocrystals. J. Phys. Chem. B 2005 7012-7021.*

Liu. Enhancing Photoluminescence quenching and photoelectric properties of CdSe quantum dots with hole accepting ligands. J. Mater. Chem. 20008 18 675-682.*

Blaunch, David. Spectrochemical Series. Published Online 2009. Accessed Apr. 7, 2015.*

(Continued)

*Primary Examiner* — Matthew E Hoban

(74) *Attorney, Agent, or Firm* — Zilka-Kotab, PC

(57) ABSTRACT

A method according to one general embodiment includes applying an organic surfactant to a nanoparticle having a $d^{10}$ configuration for altering a magnetic property of the nanoparticle. A method according to another general embodiment includes applying an organic surfactant to a II-VI semiconductor nanoparticle having a $d^{10}$ configuration for altering a magnetic property of the nanoparticle, wherein the nanoparticle has a mean radius of less than about 50 Å.

31 Claims, 4 Drawing Sheets

(56) References Cited

OTHER PUBLICATIONS

Weare. Improved Synthesis of Small (dCORE ≈ 1.5 nm) Phosphine-Stabilized Gold Nanoparticles. J. Am. Chem. Soc. 2000, 122, 12890-12891.*

"Laboratory Directed Research and Development FY2007 Annual Report" Lawrence Livermore National Laboratory.

S. Lee et al., "Effect of spin-dependent $Mn^2$ internal transitions in CdSe/$Zn_{1-x}Mn_xSe$ magnetic semiconductor quantum dot systems" Phys. Rev. B., 72, 075320; 2005.

Magana et al., "Switching on Superparamagnetism in Mn/CdSe Quantum Dots" J. Am. Chem. Soc., 128, 2931, 2006.

P. Crespo et al., "Permanent Magnetism, Magnetic Anisostropy and Hysteresis of Thiol-Capped Gold Nanoparticles" Phys. Rev. Lett., 93, 087204, 2004.

Y. Yamamoto et al., "Direct Observation of Ferromagnetic Spin Polarization in Gold Nanoparticles" Phys. Rev. Lett., 93, 116801, 2004.

* cited by examiner

| Radius (Å) | Ligand | Molecular Weight | # CdSe per NP | % CdSe on Surface | Ligands per NP | % Mass Ligands | χ ($10^{-6}$ emu/g) Ligands | χ ($10^{-6}$ emu/g) CdSe |
|---|---|---|---|---|---|---|---|---|
| 25 | HDA | 256,231 | 1166 | 28 | 145 | 13 | -0.20 | -0.26 |
| 18 | HDA | 106,425 | 435 | 38 | 102 | 22 | -0.34 | -0.16 |
| 15 | HDA | 69,988 | 252 | 44 | 95 | 31 | -0.48 | 0.68 |
| 19 | TOPO | 136,641 | 512 | 36 | 100 | 28 | -0.20 | |
| 14 | TOPO | 71,707 | 205 | 46 | 84 | 45 | -0.32 | |

FIG. 4

METHODS FOR CREATING LIGAND INDUCED PARAMAGNETISM IN NANOCRYSTALLINE STRUCTURES

The United States Government has rights in this invention pursuant to Contract No. DE-AC52-07NA27344 between the United States. Department of Energy and Lawrence Livermore National Security, LLC for the operation of Lawrence Livermore National Laboratory.

FIELD OF THE INVENTION

The present invention relates to altering magnetic properties of nanocrystalline structures, and more particularly to altering magnetic properties of nanocrystalline structures without the introduction of transition metal impurities.

BACKGROUND

Previous reports on magneto-optical (the coupling of light and magnetism) effects in nanocrystalline materials has demonstrated the advantages of intentionally doping a system with a magnetic impurity like $Mn^{2+}$. The doping might allow the host nanocrystal system to maintain its original optical properties with the added benefits of the magnetism derived from the transition metal impurity. A drawback of this approach, however, is the difficulty involved in incorporation of the dopant (transition metal) into the nanocrystal. Therefore, it would be very beneficial to obtain the sought after magneto-optical effects (optical properties remain the same while a magnetic effect is added) that are observed in systems incorporating transition metal impurities, without the inclusion of a transition metal impurity.

The importance of the nanocrystalline form of CdSe as an optical material has been well documented in the relevant literature over the last two decades. These studies have allowed researchers to exploit the size-tunable properties of CdSe quantum dots (QDs) via production of optical materials such as light emitting diodes, photovoltaics, and lasers. In turn, recent efforts have aimed to move beyond optical materials and produce magnetic materials based on CdSe.

One inherent difficulty in producing a magnetic CdSe material exists with the fact that CdSe is a native diamagnetic semiconductor and, therefore, any magnetic effects must be induced by an external source, such as a chemical dopant. To this end, many recent studies have been focused upon producing high quality transition metal doped CdSe QDs in the hope of fabricating new magnetic CdSe materials. A potential drawback, however, in chemical doping of QDs is the possibility that the dopant will disturb the optical properties of the host QDs. For instance, a reduction in the photoluminescence (PL) quantum yield was observed in Co doped CdSe QDs while a complete quenching of the band edge PL was observed in Cu doped CdSe QDs. A second difficulty in producing magnetically ordered nanoparticles is the evolution even in ferromagnets from multi-domain to single domain to superparamagnetic behavior as particle size decreases.

It would be desirable, therefore, to produce magnetic CdSe that retains the native optical properties observed in the undoped material. It would also be desirable to alter a magnetic property of a nanoparticle without requiring doping.

SUMMARY

A method according to one general embodiment includes applying an organic surfactant to a nanoparticle having a $d^{10}$ configuration for altering a magnetic property of the nanoparticle.

A method according to another general embodiment includes applying an organic surfactant to a II-VI semiconductor nanoparticle having a $d^{10}$ configuration for altering a magnetic property of the nanoparticle, wherein the nanoparticle has a mean radius of less than about 50 Å.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 4 is a table displaying experimental results regarding the magnetic susceptibility of 15 Å radius CdSe quantum dots.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a method comprises applying an organic surfactant to a nanoparticle having a $d^{10}$ configuration for altering a magnetic property of the nanoparticle.

In another general embodiment, a method comprises applying an organic surfactant to a II-VI semiconductor nanoparticle having a $d^{10}$ configuration for altering a magnetic property of the nanoparticle, wherein the nanoparticle has a mean radius of less than about 50 Å.

Some embodiments described herein may include a method to induce magnetism in undoped CdSe nanocrystals and nanocrystals of other composition. Instead of using traditional methods like transition metal doping to induce magnetism in these systems, exploitation of the nanocrystal surface chemistry has provided an ability to "switch" magnetism on and off in nanocrystalline CdSe. It has been surprisingly found through unexpected experimental results that magnetism in CdSe Quantum Dots (QDs) can be induced via manipulation of the surface chemistry. The paramagnetic behavior of the CdSe QDs can be enhanced by variation of the endgroup functionality of the passivating layer with no evidence for ferromagnetism. The interaction of surface ligands with π-back bonding character promotes charge transfer from the CdSe nanocrystals to the surface molecule, leaving unfilled d electrons on the CdSe nanocrystal. The unfilled, polarizable, d electrons lead to a magnetic moment in these systems. The magnetic moment can be increased by decreasing particle size due to the increase in the surface-to-bulk ratio. The magnetic moment can also be enhanced by selecting not only ligands with π-back bonding characteristics but also with an extended π-conjugation system.

Figure 1:
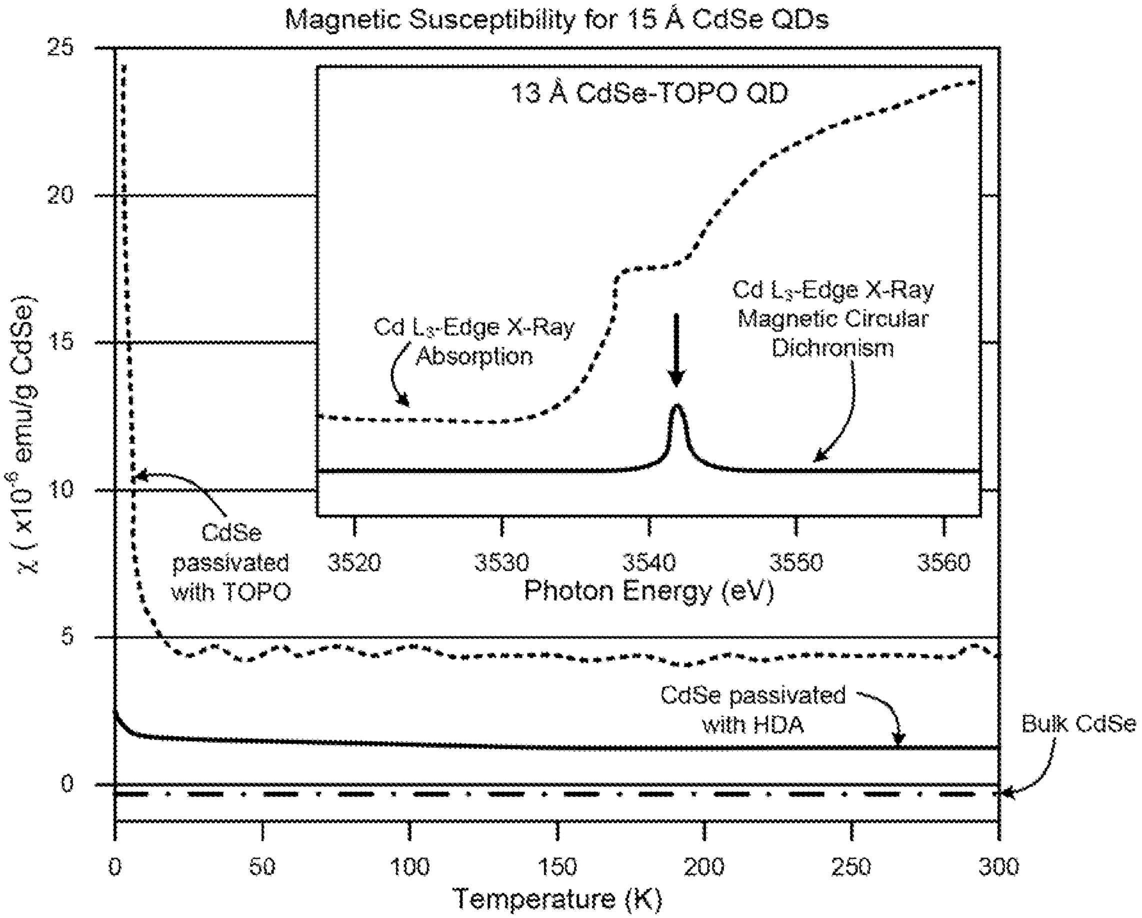
FIG. 1 displays a graph of the magnetic susceptibility of 15 Å radius CdSe quantum dots passivated with either trioctyl phosphine oxide (TOPO) or hexadecylamine (HDA). The graph also contains the magnetic susceptibility for bulk CdSe. The graph inset in FIG. 1 displays a Cd $L_3$-edge x-ray absorption spectrum and the associated x-ray magnetic circular dichroism (XMCD) signal for 13 Å radius CdSe quantum dots passivated with TOPO.
Figure 2:
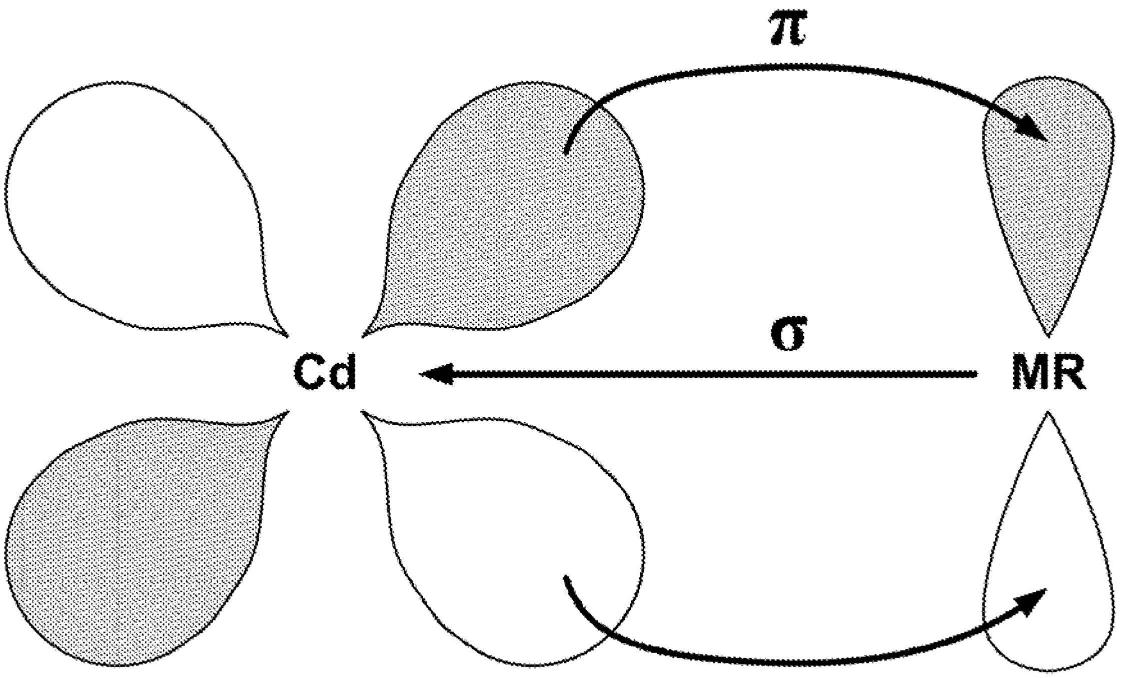
FIG. 2 is a schematic of π-backbonding in a Cd $d^{10}$ system.

Superconducting quantum interference device (SQUID) magnetometry measurements provide conclusive evidence of paramagnetism in CdSe-HDA and CdSe-TOPO QDs (FIG. 1). Nonetheless, one must address the possibility that the magnetic properties of the CdSe-HDA and CdSe-TOPO QDs arise from impurities incorporated into the nanocrystalline semiconductor during colloidal synthesis. Evidence that the paramagnetic properties are intrinsic to the CdSe quantum dot systems rather than contamination by magnetic impurities is two-fold: first, the degree of magnetization observed in the QDs is inconsistent with the presence of even low level concentrations (<5 ppm) of magnetic contaminants such as Fe, Ni, Co and/or Mn; second, atomic emission measurements demonstrate that, with the exception of Cd, the concentration of any transition metal element is below detection limits (ppb). In the absence of magnetic impurities, the contrasting behavior of the CdSe-HDA and CdSe-TOPO systems indicates that the paramagnetic properties of the CdSe QDs are dependent upon their interaction with the organic surfactant molecules, as is illustrated in FIG. 2.

Ligand exchange experiments provide support for this assignment. Exchange of TOPO for pure dodecanonitrile (DDN) surfactant on the 15 Å CdSe-TOPO QDs resulted in a reduction in the magnetic susceptibility. Even so, the magnitude of the magnetic susceptibility remained higher than for 151 CdSe-HDA QDs. This is significant because, according to the n-acceptor scale, TOPO>DDN>HDA as a π-acceptor and, therefore, it is expected that they will show similar trends in the charge transfer strength. Hence, there is a strong correlation between the n-acidity of the ligand and the resulting magnetic susceptibility of the CdSe QDs. Since the HDA, TOPO and DDN ligands bind to the CdSe QDs through different types of atom (N, P or O and N respectively) and contain different aromatic functionalities, it is proposed that the ability to induce paramagnetic behavior in the CdSe QDs can be extended to include surfactants that co-ordinate to Cd via numerous elements (including C, O, N, S and P) within an aromatic system.

Figure 3:
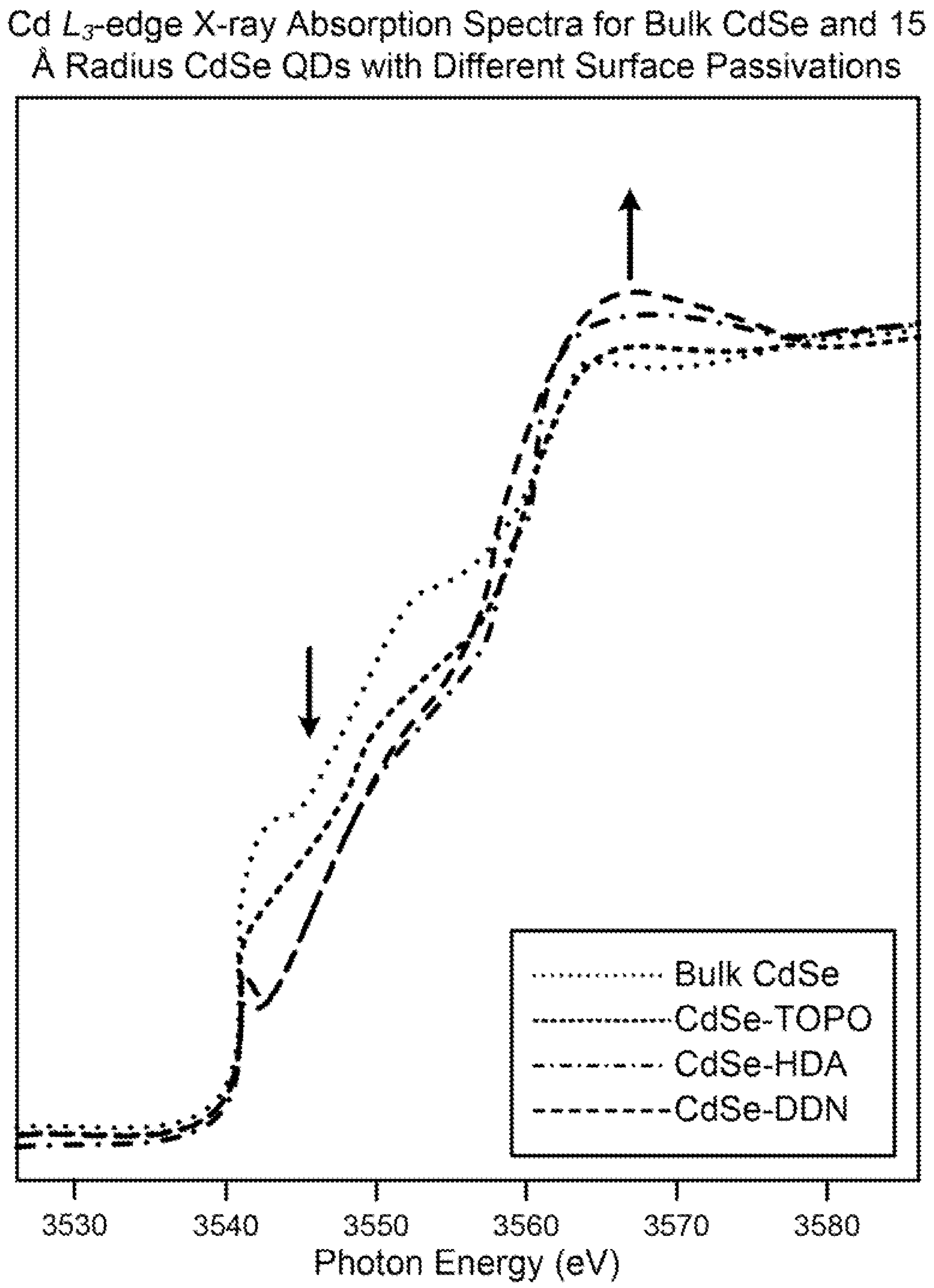
FIG. 3 is a graph which shows the effect of surface termination of the Cd $L_3$-edge XAS spectra of 15 Å radius CdSe quantum dots.

Although the SQUID and XMCD data provide strong evidence of a surface termination driven dependence of the magnetic susceptibility, one must address the contribution that dangling bonds may play in the magnetic properties of the CdSe QDs. Cd $L_3$-edge XAS is an excellent tool to probe the s and sp hybridized DOS. Since the XAS experiments are inherently surface sensitive (electron yield detection) and enable investigation of the sp hybridized states, the measurements can indirectly probe the relative amount of empty p-like states in the CdSe QDs that are related to dangling bonds. FIG. 3 displays the Cd $L_3$-edge XAS spectra for 15 Å radius CdSe QDs passivated with different surface ligands alongside the bulk CdSe spectrum. In the energy region between 3540-3550 eV, a large reduction (about 15%) in XAS intensity (decrease in empty states) is seen as the ligand changes from TOPO to HDA which is consistent with the reported relative increase in passivation by HDA. Even so, the associated reduction in the number of dangling bonds cannot account for the nearly order of magnitude increase in the Curie constant. By ruling out dangling bond contributions, the contrasting behavior of the CdSe-HDA, CdSe-TOPO, and CdSe-DDN systems indicates that the paramagnetic properties of the CdSe QDs are dependent upon their interaction with the organic surfactant molecules.

The preceding descriptions may be used to further understand the methods disclosed below. In addition, any descriptions, definitions, etc., may be included in the description of the methods.

According to one embodiment, a method comprises applying an organic surfactant to a nanoparticle having a $d^{10}$ configuration for altering a magnetic property of the nanoparticle. In some embodiments, the nanoparticle may be a II-VI semiconductor, such as Au, Ag, Pt, alloys including II-VI semiconductors, etc.

In one particularly preferred embodiment, the nanoparticle may include CdSe.

In one approach, the method may further comprise removing the surfactant for substantially returning the magnetic property of the nanoparticle to its unaltered state. For example, if the nanoparticles prior to manipulation had no net magnetic effect, then after the surfactant is removed, the nanoparticles may once again have no net magnetic effect, even though it may have had magnetic properties when in contact with the surfactant.

In one approach, the nanoparticle may have a mean radius of less than about 50 Å, alternatively less than about 25 Å, alternatively less than about 15 Å.

In some preferred embodiments, the surfactant may include a ligand with π-bonding orbitals. Also, the surfactant may include an aromatic group, e.g., the surfactant may have a functional group that has aromaticity associated with it that is part of a conjugated system.

In some more embodiments, the surfactant may include at least one of a thiolate group, a thiamine group, a nitrile group, a pyridine group, a carboxyl group, an aldehyde group, an ester group, an acid anhydride group, and a phosphine group, which may further include phosphines and phosphine oxides.

In preferred embodiments, the optical properties of the nanoparticle may remain unchanged when the crystal exhibits its magnetism. For example, if a nanoparticle exhibits a 125 nm wavelength light refraction characteristic before introduction of magnetic properties, then after introduction of magnetic properties, the nanoparticle may still exhibit the same 125 nm light wavelength refraction characteristic.

In some preferred embodiments, the nanoparticle may be substantially free of magnetic transition metal impurities after introduction of magnetic properties, e.g., less than about 1000 parts per billion (ppb) total impurities, more preferably less than about 100 ppb total impurities. In addition, in some embodiments, the nanoparticle may be substantially free of ferromagnetic material, e.g., less than about 1000 parts per billion (ppb) total ferromagnetic material, more preferably less than about 100 ppb total ferromagnetic material.

EXPERIMENTS

Experiment 1

Magnetic susceptibility measurements ($\chi(T)=M(T)/H$) were made using a SQUID (Superconducting Quantum Interference Device) magnetometer and the measurements provide evidence of changes in the magnetic properties of a CdSe QD when compared to bulk CdSe. FIG. 5 displays $\chi$(T) for 15 Å radius CdSe QD samples passivated with hexadecylamine (HDA) and trioctylphosphine oxide (TOPO) and the expected value for bulk CdSe. The QD samples obey a modified Curie law with $\chi_o>0$ and Curie constants, C, strongly dependent on the surface termination: C=32, (1.2)$\times10^{-6}$ emu K/g for TOPO (HDA) surface ligand passivation. These values only consider the total sample mass, and do not separate the contributions due to the surface ligands. Atomic emission indicates non-Cd transition metal impurities are <1 ppb, suggesting that chemical bonding induces local paramagnetic moments on the particle surface.

Both $\chi$(T) and M(H) scans indicate there is no ferromagnetic ordering in these samples, so experiments were performed to ensure that the observed paramagnetism could unambiguously be attributed to a surface effect. Both x-ray magnetic circular dichroism (XMCD) and x-ray absorption spectroscopy (XAS) were performed to directly probe the Cd electronic structure of the particles.

Since the magnetic properties are induced by a chemical bonding effect, XMCD experiments at the Cd $L_3$-edge (probing 4d states where chemistry is most likely to occur) should yield detailed, element specific information about the spin polarization in these materials. As shown in the inset in FIG. 1, a 13 Å radius CdSe-TOPO QD appears to exhibit an XMCD signal at about 3542 eV, an energy where vacant Cd d levels are expected to arise. The signal is on the order of about $5\times10^{-4}$, which is consistent with a moment of ~0.01$\mu_B$/Cd. Although this value for the magnetic moment is consistent with the M(H) measurements, it must be noted that the signal is only about 2$\sigma$ above the noise.

When considering the temperature independent part of the magnetic susceptibility, the appearance of positive $\chi$ values is intriguing because bulk CdSe has $\chi=-0.334\times10^{-6}$ emu/g. If the diamagnetic contribution from the TOPO and HDA ligands ($\chi=-0.73\times10^{-6}$ and $-1.4\times10^{-6}$ emu/g, respectively) are considered, then the overall magnetic susceptibility for the QD materials should be slightly more negative than that of bulk CdSe. Thus, ignoring interaction effects, it would be expected that the $\chi$ value of bulk CdSe would be an upper limit on the magnetic susceptibility, which is not experimentally observed. This behavior can be explained by considering the main components of magnetic susceptibility, $\chi$, which can be described as $\chi=\chi_c+\chi_L+\chi_s+\chi_{vv}$, where $\chi_c$ is the core-electron diamagnetic contribution, $\chi_L$ is the Langevin contribution, $\chi_s$ is the surface ligand diamagnetic contribution, and $\chi_{vv}$ is the Van-Vleck contribution. While $\chi_c$, $\chi_L$, and $\chi_s$ are negative contributors to the magnetic susceptibility, $\chi_{vv}$ is a positive value and represents the paramagnetic contribution to the magnetic susceptibility. Both $\chi_L$ and $\chi_{vv}$ should vary with particle size as $\chi_L$ depends on the bond length, a size dependent value, and $\chi_{vv}$ depends on the matrix elements between the bonding cation orbitals and anti-bonding anion (or ligand) orbitals, which should change with surface termination. What this implies experimentally is that both the lattice contraction and the increasing degree of charge transfer bond between the Cd atoms and the surface ligands could result in a positive $\chi$ value, although charge transfer is expected to play a more dominant role. This charge transfer effect can manifest itself in the form of $\pi$-backbonding, with the degree of backbonding depending on the ligand $\pi$-acceptor strength. Following the $\pi$-acceptor scale, it is expected that TOPO>HDA as a $\pi$-acceptor and similar trends in the strength of charge transfer. It is noted that although TOPO is a phosphine oxide, trioctylphosphine impurities in the TOPO passivate some of the CdSe QD surface. In addition, it is expected that although oxygen is typically thought of as a donor atom, the P═O bond of TOPO contains empty $\pi$* orbitals and should therefore be a good n-acceptor. Therefore, the correlation between the positive $\chi_{vv}$ values and the increase in the ligand $\pi$-acidity indicates that paramagnetism is arising from the molecular level interactions occurring between Cd atoms and the surface ligands.

One oddity in this observation is that alkylamines posses no low-lying orbitals and do not provide an obvious means of withdrawing electron density from the 4d-orbitals of Cd. It is suggested, therefore, that the paramagnetic properties of the CdSe-HDA QDs are induced by a chemical impurity in the bulk HDA solvent. For instance, chemical impurities (phosphonic acid) are present in the bulk TOPO solvent and are the main driving force behind the successful synthesis of CdSe QDs. Time of flight-secondary ion mass spectrometry (TOF-SIMS) measurements verify that organic impurities are present in bulk HDA and, as a result, present on the surface of the CdSe-HDA QDs. In addition to the anticipated signature for HDA, the TOF-SIMS spectra provide evidence for molecules containing the cyano (—CN) group within the HDA solvent and the CdSe-HDA QD samples. The presence of the cyano functionality is extremely significant because, in contrast to the amine group of HDA, —CN is capable of accepting Cd 4d electron density via back-donation into the $\pi$*-orbitals of the CN triple bond. Indeed, when the ligand, dodecanitrile (DDN), was intentionally ligand exchanged onto the CdSe QD surface, a modest increase in the Curie constant (C=3.8$\times10^{-6}$ emu K/g) was observed via magnetic susceptibility. Therefore, as the TOPO ligand can also participate in $\pi$-backbonding, back-donation between the Cd and —XL (where X is endgroup functionality and L is the ligand) is probably the mechanism for enhancement of the vacant 4d DOS and the origin of paramagnetic properties in the CdSe QDs.

Experiment 2

The appearance of magnetism in otherwise non-magnetic materials is not an unfamiliar concept in nanoscale materials where surface effects become significant, and for smaller particles, dominant. For instance, two previous studies have shown that Au exhibits ferromagnetic (FM) tendencies when in the nanocrystalline form. There is currently a debate in the literature with regards to the nature of the mechanism (i.e., is the magnetism intrinsic in the Au nanoparticle or is it induced by surface ligands). A recent report examined the thermodynamic properties of organically passivated CdSe QDs and found that the QDs exhibit size dependent behavior in the magnetic susceptibility. It was suggested that the magnetism was a surface effect but was not due to organic ligand binding but the lack thereof (i.e., dangling bonds). Finally, a recent observation of magnetization in PbSe QDs suggests that the magnetism is intrinsic to the QD and not due to a surface effect.

In bulk form, CdSe is diamagnetic ($\chi=-5.09\times10^{-6}$ emu/mol) primarily due to the Larmor contribution of the core electrons. However, as the surface to volume ratio increases, the system becomes paramagnetic. The following experimental discussion presents a systematic study of the magnetic properties of undoped CdSe nanoparticles as a function of size and surface termination. There have also been efforts in producing paramagnetism in undoped CdSe by simply manipulating the surface termination.

A series of CdSe QDs with a mean radius from about 9 Å to about 25 Å and coated with a passivating layer of either trioctylphosphine oxide (TOPO) or hexadecylamine (HDA)

ligands were prepared using established protocols. The QD size and size dispersity within each QD sample were derived using UV-Visible absorption spectroscopy. A well-defined method was employed for the purposes of ligand exchange at the QD surfaces and has been modeled after an established procedure. Initially, the QD sample of interest was immersed in an excess of the substituting ligand, which was either in the form of a pure liquid (e.g., dodecanonitrile (DDN)) or a saturated solution in toluene (e.g., TOPO or HDA), and the mixture was sonicated for about 3 hours to aid in driving the ligand exchange. Following sonication, any QDs that had resisted ligand exchange were removed as a solid residue by centrifuging the mixture and extracting the supernatant. The addition of methanol served to precipitate the ligand exchange QDs from the extracted supernatant solution. Separation of the precipitate and solution was achieved by centrifuging the sample for a second time.

Magnetic measurements as a function of both temperature and magnetic field were performed in a SQUID magnetometer (Quantum Design). Due to the very small signals observed in these materials, exceptional care was taken to prepare the measurements and avoid any potential contamination from magnetic impurities. After trying and rejecting multiple sample holders (silicon, gelatin capsules, kapton foil, copper foil, etc.) due to significant low temperature Curie tails, polypropylene was found to have a constant magnetic signal and negligible Curie tail. In each case a new polypropylene sample holder was prepared and measured in the magnetometer to obtain a background signal. The nanoparticles were solvated in toluene and deposited onto the sample holder where the toluene was evaporated. This process was repeated numerous times to obtain a sufficient mass of nanoparticles on the sample holder. Then the sample holder was placed under vacuum to ensure complete removal of any residual toluene and weighed to obtain the mass of nanoparticles deposited, with typical masses from about 2 mg to about 20 mg. The sample was then measured following the same temperature and magnetic field protocol as the background measurement. Each data point is an average of multiple scans, as was the background, and signals were typically on the order of $10^{-5}$-$10^{-6}$ emu at 1 kOe. The 14 Å radius nanoparticles and sample holder signal show that a 2.51 mg sample provides roughly twice the signal after background subtraction that the background contributes. The distinct temperature and magnetic field behaviors ensure that the background is being correctly removed and that the resulting signal is due to the sample. Separate quantities of about 100 mg of both the TOPO and HDA ligands were also measured to determine their contribution to the nanoparticle magnetic susceptibility and to look for paramagnetic impurities that might compromise the nanoparticle measurements.

As expected for most organic molecules, both TOPO and HDA are diamagnetic with temperature independent magnetic susceptibilities of $-0.72\times10^{-6}$ emu/g and $-1.54\times10^{-6}$ emu/g respectively. These values are substantially equivalent to estimates from literature values of organic functional groups, which predict $-0.76\times10^{-6}$ emu/g and $-1.08\times10^{-6}$ emu/g. These contributions are not expected to change appreciably when attached to the nanoparticles. It is possible to estimate the fraction of each nanoparticle surface that is bonded to a ligand, thus indicating that the organic ligands account for about 13% to about 45% of the mass in each nanoparticle, depending on its size. This, along with the diamagnetic susceptibility contribution per gram is summarized in FIG. 4. Using these assumptions, the expected magnetic susceptibility for the 25 Å nanoparticles, assuming they behave as bulk CdSe, is $-0.49\times10^{-6}$ emu/g, while the measured value is $-0.26\times10^{-6}$ emu/g, demonstrating there is a positive temperature independent contribution not observed in the bulk of these two materials.

As the particle size decreases, this temperature independent contribution increases significantly, dominating the signal for the 14 Å nanoparticles. A second feature observable in the nanoparticles is an increasing Curie tail that is not due to a background contribution and suggests the appearance of local magnetic moments. Low temperature M(H) measurements obey a combination of a Brillouin function, consistent with local moments, and a linear term for the temperature independent contribution. In fact, the functions that describe $\chi(T)$ and M(H) at low temperature can be used to constrain the actual weight fraction of ligands, which provide self consistent values quite comparable to the original estimates (in parentheses), with weight fractions of 0.33 (0.31), 0.20 (0.22) for the 14 Å and 18 Å particles respectively. While 0.13 is not too far off for the 25 Å particles, the numbers do not converge well, which may be explained if the core of the nanoparticle is behaving like the bulk, in which case a significant additional term will need to be included.

There are two significant features observed in the measured data: a significant change in the temperature independent susceptibility ($\chi_o$) correlated with particle size, and the evolution of a weak temperature dependant behavior consistent with Curie paramagnetism, each of which are discussed in detail below.

There are a number of terms that contribute to the total $\chi_o$ including terms associated with conduction electrons—Pauli paramagnetic susceptibility and Landau diamagnetic susceptibility—which should not be important in the case of a semiconductor, and other terms that are atomic in nature such as Larmor diamagnetism (core electrons) and Van Vleck paramagnetism, which arises from mixing of the electronic ground state with energetically nearby excited states. The Larmor contribution is independent of the local environment, and thus should not change with either the size of CdSe particles, or the bonding of ligands. Additionally it is diamagnetic, so cannot play a role in the increase of $\chi_o$ with decreasing particle size. In macroscopic samples, the Van Vleck contribution is also typically considered a single atom effect and therefore not sensitive to the local environment. However, this changes if the local environment provides energetically close excited states, such as through chemical bonding. In this case, it is defined by the following equation:

$$\chi_{VV} = \frac{2N\mu_B^2\lambda^2(1-\alpha_p^2)}{\pi^2c^2(E^a-E^b)}$$

where N is the number of valence electrons (electron density), ΔE is the separation between the bonding and antibonding orbitals (ligand $\pi^*$) and $\alpha_p$ indicates the charge transfer between neighboring atoms. This is the only variable in the equation and it should be independent of particle size. Theoretical calculations find ΔE=6.10 eV and $\alpha_p$=0.77 for bulk CdSe.

The nanoparticles studied here are considerably smaller than the single domain limit for most ferromagnetic particles (>70 Å diameter for fcc Co, >150 Å diameter for hcp Co or Fe), so absent a remarkably large anisotropy, at best particles of this size might be superparamagnetic, and thus should display no hysteresis unless there is coupling between particles: Given the separation distance between nanoparticles, this would be a very weak interaction. These experimental results show no indication of ordering within the particles, however as particle size decreases there is an apparent evolution of local magnetic moments that increase with decreasing particle size. This is observed both as a Curie tail in measurements of $\chi(T)$ and in an additional Brillouin term observed in the low temperature M(H) measurements. Combining these two measurements permit the extraction of the size of the local moment spin per nanoparticle.

It is concluded that the ability to induce magnetism in CdSe quantum dots can be achieved via modification of the surface chemistry. Due to charge transfer interactions between the quantum dot surface atoms and the ligands, a Van-Vleck paramagnetic effect can be observed. The strength of this effect is directly correlated to the ligands ability to accept charge density from the quantum dot surface (strong $\pi$-backbonding). Although we cannot specifically identify which atom of the CdSe particle is responsible for this behavior, it most likely occurs from the Cd atoms as these atoms are passivated rather easily.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

applying dodecanonitrile (DDN) to a nanoparticle comprising CdSe for altering a magnetic property of the nanoparticle, wherein the nanoparticle has a mean radius in a range of about 50 Å or less, and.

2. The method of claim 1, wherein the nanoparticle is an alloy comprising a II-VI semiconductor.

3. The method of claim 1, wherein the nanoparticle has a mean radius in a range of about 15 Å to about 9 Å.

4. The method of claim 1, with the proviso that the nanoparticle comprises no more than 100 ppb total magnetic transition metal impurities.

5. The method of claim 1, with the proviso that the nanoparticle comprises no more than 100 ppb total ferromagnetic material.

6. A method, comprising:

applying dodecanonitrile (DDN) to a nanoparticle for altering a magnetic property of the nanoparticle, wherein the nanoparticle has a mean radius in a range from about 15 Å to about 9 Å.

7. The method of claim 6, wherein the nanoparticle includes CdSe.

8. The method of claim 6, wherein the nanoparticle comprises an alloy of one or more II-VI semiconductors.

9. The method of claim 6, with the proviso that the nanoparticle comprises about 100 ppb or less total magnetic transition metal impurities.

10. The method of claim 6, with the proviso that the nanoparticle comprises about 100 ppb or less total ferromagnetic material.

11. The method as recited in claim 1, wherein altering the magnetic property of the nanoparticle comprises inducing a paramagnetism in the nanoparticle.

12. The method as recited in claim 11, wherein the paramagnetism is induced by one or more molecular interactions between the nanoparticle and the DDN.

13. The method as recited in claim 11, wherein the paramagnetism is induced by a chemical impurity in a passivating agent solvent and/or on a surface of the nanoparticle-surfactant complex.

14. The method as recited in claim 13, wherein the chemical impurity is an organic impurity, and wherein the organic impurity includes a cyano group.

15. The method as recited in claim 8, wherein the one or more II-VI semiconductors comprise CdSe.

16. The method of claim 1, the nanoparticle consisting of the CdSe.

17. The method as recited in claim 6, wherein the nanoparticle consists of platinum.

18. The method as recited in claim 1, wherein the nanoparticle consists of the CdSe, wherein the nanoparticle has a mean radius in a range of about 15 Å to about 9 Å, wherein the nanoparticle comprises no more than 100 ppb total magnetic transition metal impurities, and wherein the nanoparticle comprises no more than 100 ppb total ferromagnetic material.

19. The method as recited in claim 1, wherein the nanoparticle consists of an alloy of the CdSe and at least one additional II-VI semiconductor material, wherein the nanoparticle has a mean radius in a range of about 15 Å to about 9 Å, wherein the nanoparticle comprises no more than 100 ppb total magnetic transition metal impurities, and wherein the nanoparticle comprises no more than 100 ppb total ferromagnetic material.

20. The method as recited in claim 6, wherein the nanoparticle consists of CdSe, wherein the nanoparticle comprises no more than 100 ppb total magnetic transition metal impurities, and wherein the nanoparticle comprises no more than 100 ppb total ferromagnetic material.

21. The method as recited in claim 6, wherein the nanoparticle consists of Pt, wherein the nanoparticle comprises no more than 100 ppb total magnetic transition metal impurities, and wherein the nanoparticle comprises no more than 100 ppb total ferromagnetic material.

22. The method as recited in claim 6, wherein the nanoparticle consists of an alloy of II-VI semiconductors, wherein the nanoparticle comprises no more than 100 ppb total magnetic transition metal impurities, and wherein the nanoparticle comprises no more than 100 ppb total ferromagnetic material.

23. A method, comprising:

immersing nanoparticles comprising a group II-VI semiconductor or an alloy including group II-VI semiconductors in dodecanonitrile (DDN);

sonicating the nanoparticles immersed in the DDN for at least three hours;

centrifuging the sonicated nanoparticles and DDN; and decanting a supernatant from the centrifuged nanoparticles and DDN.

24. The method as recited in claim 23, comprising adding methanol to the supernatant to precipitate ligand-exchanged ones of the nanoparticles; and centrifuging the methanol and supernatant; and collecting a precipitate after centrifugation, the precipitate comprising the ligand-exchanged ones of the nanoparticles.

25. The method as recited in claim 23, comprising adding methanol to the supernatant to precipitate ligand-exchanged ones of the nanoparticles;

centrifuging the methanol and supernatant; and collecting a precipitate after centrifugation, the precipitate comprising the ligand-exchanged ones of the nanoparticles.

26. The method as recited in claim 23, wherein the nanoparticles consist of CdSe.

27. The method as recited in claim 23, wherein the nanoparticles consist of CdSe, wherein the nanoparticles has a mean radius in a range of about 15 Å to about 9 Å, wherein the nanoparticles comprise no more than 100 ppb total magnetic transition metal impurities, and wherein the nanoparticles comprise no more than 100 ppb total ferromagnetic material.

28. The method as recited in claim 23, wherein the nanoparticles consist of an alloy of CdSe and at least one additional II-VI semiconductor material, wherein the nanoparticles has a mean radius in a range of about 15 Å to about 9 Å, wherein the nanoparticles comprise no more than 100 ppb total magnetic transition metal impurities, and wherein the nanoparticles comprise no more than 100 ppb total ferromagnetic material.

29. The method as recited in claim 23, wherein the nanoparticles consist of CdSe, wherein the nanoparticles comprises no more than 100 ppb total magnetic transition metal impurities, and wherein the nanoparticles comprises no more than 100 ppb total ferromagnetic material.

30. The method as recited in claim 23, wherein the nanoparticles comprises no more than 100 ppb total magnetic transition metal impurities, and wherein the nanoparticles comprises no more than 100 ppb total ferromagnetic material.

31. The method as recited in claim 23, wherein the nanoparticles consist of the alloy of II-VI semiconductors, wherein the nanoparticles comprise no more than 100 ppb total magnetic transition metal impurities, and wherein the nanoparticles comprise no more than 100 ppb total ferromagnetic material.

* * * * *